United States Patent [19]

Pannell

[11] Patent Number: 5,107,051
[45] Date of Patent: Apr. 21, 1992

[54] HALOGEN RESISTANT HYDROTREATING PROCESS AND CATALYST

[75] Inventor: Richard B. Pannell, Kingwood, Tex.

[73] Assignee: Exxon Chemical Patents Inc., Linden, N.J.

[21] Appl. No.: 323,518

[22] Filed: Mar. 14, 1989

[51] Int. Cl.$^5$ .................................. C07C 1/00
[52] U.S. Cl. ............................. 585/733; 585/255; 208/14; 208/142; 208/262.1; 525/222; 525/339
[58] Field of Search ............... 208/14, 262, 142; 585/255, 733, 222, 339

[56] References Cited

U.S. PATENT DOCUMENTS

| | | | |
|---|---|---|---|
| 2,025,032 | 12/1935 | Arnold et al. | 585/733 |
| 2,886,605 | 5/1959 | McClure et al. | 585/733 |
| 2,911,395 | 11/1959 | Small | 525/339 |
| 2,963,467 | 12/1960 | Small | 525/339 |
| 3,356,660 | 12/1967 | Moritz et al. | 525/339 |
| 3,362,939 | 1/1968 | Moritz et al. | 525/339 |
| 3,432,518 | 3/1969 | Kallenbach | 525/339 |
| 3,595,931 | 7/1971 | Hay et al. | 208/262.5 |
| 3,855,347 | 12/1974 | Oricchio | 585/733 |
| 3,947,509 | 3/1976 | Isa et al. | 585/255 |
| 4,113,790 | 9/1978 | Cesca et al. | 585/255 |
| 4,328,090 | 5/1982 | Stuckey, Jr. et al. | 208/44 |
| 4,337,329 | 6/1982 | Kubo et al. | 525/339 |
| 4,376,222 | 3/1983 | Shubkin et al. | 585/255 |
| 4,384,081 | 5/1983 | Kubo et al. | 525/339 |
| 4,511,710 | 4/1985 | Wang et al. | 208/262.1 |
| 4,540,480 | 9/1985 | Azuma et al. | 208/44 |
| 4,547,620 | 10/1985 | Miyata et al. | 208/262.1 |
| 4,560,817 | 12/1985 | Bobsein et al. | 525/339 |
| 4,629,766 | 12/1986 | Malatasta et al. | 525/339 |
| 4,629,767 | 12/1986 | Shyr et al. | 525/339 |
| 4,652,688 | 3/1987 | Brophy et al. | 585/733 |
| 4,719,007 | 1/1988 | Johnson et al. | 208/262.1 |
| 4,816,138 | 3/1989 | Visser et al. | 208/262.5 |
| 4,818,368 | 4/1989 | Kaines et al. | 208/262.5 |
| 4,851,476 | 7/1989 | Willis | 525/339 |

OTHER PUBLICATIONS

"Heterogeneous Hydrogenolysis of Some Fluorocarbons"; Witt et al., *J. Catalysis*, vol. 71, pp. 270–277 (1981).

"Hydrodechlorination Kinetics and Reaction Mechanisms"; Weiss & Kreiger, *J. Catalysis*, vol. 6, pp. 167–185 (1966).

"Hydrodechlorination of 1, 1-Bis(p-chlorophenyl)-2, 2-dichloroethylene (p,p' DDE) in the Vapor Phase", LePierre et al., *J. Catalysis*, vol. 52, pp. 59–71 (1978).

*Chemistry of Catalytic Resources*, Gates, Katzer and Shuit, McGraw-Hill, 1979, p. 438, Table 5-17.

*Primary Examiner*—Helane Myers
*Attorney, Agent, or Firm*—Jaimes Sher; Myron B. Kurtzman

[57] ABSTRACT

A process and catalyst have been developed for hydrotreating halogen containing olefinic feedstock including resins. The process and catalyst dehalogenates both saturated and unsaturated feedstock. The catalyst is not deactivated by prolonged exposure to a halogen. The composition of the catalyst includes oxides from Group VIIIA, tungsten oxide or molybdenum oxide and a basic promoter oxide from Group IA, Group IIA, Lanthanides and Actinides.

18 Claims, No Drawings

HALOGEN RESISTANT HYDROTREATING PROCESS AND CATALYST

FIELD OF THE INVENTION

The present invention is a new process and catalyst for hydrotreating (catalytic hydrogenation) hydrocarbon feedstocks containing a halogen. The process can be used on various unsaturated hydrocarbon feedstocks including resins containing cyclic olefins or saturated feedstocks. The process and catalyst also dehalogenates the feedstock.

BACKGROUND ART

Small amounts of halogens in feedstock will deactivate the typical hydrotreating catalysts. Processing steps such as polymerization reactions can require the utilization of a halogen containing catalyst. After these process steps the hydrocarbon feedstock will contain a residual amount of halogen. If subsequent hydrotreating of the feedstock is desired, the small amounts of halogen retained from prior exposure to the halogen containing catalyst presents a processing dilemma.

Hydrotreating is often desired for making lighter colored petroleum resins from previously polymerized olefins made by using Friedel-Crafts reagents such as $AlCl_3$ as a catalyst. Hydrogenation after polymerization gives a lighter colored petroleum resin with superior adhesive properties and better age resistance to ultraviolet light.

Hydrotreating catalysts for making lighter colored resins have been previously described in U.S. Pat. Nos. 4,328,090 and 4,629,766. The catalysts are alumina supported sulfided nickel-tungsten or nickel-molybdenum compositions. These catalysts are directed to hydrogenation of resins produced by polymerization of unsaturated cyclic olefin and diolefins.

Other hydrogenation systems for resins containing aromatic rings use $H_2$ gas with a catalyst of a combination of noble metals such as Pd, Ru, Rh, Re and Pt on a carrier See U.S. Pat. No. 4,540,480.

Additional hydrotreating catalysts have been made with a variety of combinations of nickel, molybdenum, cobalt and tungsten on supports such as silica-alumina. These catalysts are often directed to hydrodesulphurization of petroleum residues. See *Chemistry of Catalytic Resources*, Gates, Katzer and Shuit, McGraw-Hill, 1979, p.438, Table 5-17.

A hydrodesulphurization catalyst for petroleum has been prepared from nickel and/or cobalt oxide with molybdenum and/or tungsten oxide with lanthanum and/or cerium oxide on alumina. U.S. Pat. No. 3,975,303. The catalyst was not directed toward a process of hydrogenation or hydrotreating in the presence of halogen.

Other catalysts have been developed for hydrodehalogenation. One process employs a carbon supported Pd with $H_2$ gas for hydrogenolysis of unsaturated fluorocarbons. "Heterogeneous Hydrogenolysis of Some Fluorocarbons"; Witt et al; *J. Catalysis*, Vol. 71, pp 270-277 (1981). Olefinic chlorides have been hydrodechlorinated by Pt-alumina catalyst and Pd-alumina with $H_2$ gas. "Hydro-dechlorination Kinetics and Reaction Mechanisms", Weiss and Kreiger, *J. Catalysis*, Vol. 6, pp 167-185 (1966); "Hydrodechlorination of 1, 1-Bis (p-chlorophenyl)-2, 2-dichloroethylene ( p,p'-DDE ) in the Vapor Phase", LaPierre et al, *J. Catalysis*, Vol. 52, pp 59-71 (1978).

SUMMARY OF THE INVENTION

The process utilizes a catalyst for hydrotreating a hydrocarbon feedstock containing up to 1% by weight of a halogen. Examples of feedstocks are hydrocarbon resins produced by Friedel-Crafts polymerization and solvents used in the polymerization process. The catalyst is not deactivated by halogens which are frequently present in hydrocarbon resins and solvents previously subjected to Friedel-Crafts polymerization processing using catalysts such as $AlCl_3$ and $BF_3$. The process and catalyst also dehalogenates the feedstock. This process is also usefully employed to hydrotreat resins described in U.S. Pat. Nos. 4,328,090 and 4,629,766.

The catalyst used in the process contains oxides of the following elements: 1-12% by weight of a Group VIII metal, preferably nickel, cobalt or mixtures thereof; 3-35% by weight of tungsten or molybdenum; and 0.25-10% by weight of a basic promoter on a support preferably on an alumina support in predominantly the gamma or eta form. The hydrotreating process decolorizes the polymeric resin lowering the Gardner color number from 6 to about the range of 1-3. The resins have better adhesive qualities and age resistance to ultraviolet light. The life of the hydrotreating catalyst is greatly extended due to the halogen resistance.

DETAILED DESCRIPTION OF THE INVENTION

The process and catalyst of this invention are for hydrogenating olefins and diolefins including cyclic olefins and aromatics containing olefinic functions in the presence of a halogen. Although the process and catalyst of this invention is directed to improving the qualities and decolorization of hydrocarbon resins used for adhesives, the process can be used to rid an olefinic or saturated feedstock of halogens while performing the hydrotreating process. The hydrotreating processes and catalysts previously described are deactivated by the halogen component that is residual in the feedstock from the earlier catalytic treatment. The catalyst produced in accordance with this invention is substantially not deactivated in the presence of halogen.

The hydrogenation process is particularly useful in hydrotreating hydrocarbon resins used for adhesive products. The resins are often products of polymerization process using a Friedel-Crafts catalyst such as $AlCl_3$ or $BF_3$. The polymerization conditions typically include mixing the olefins in a solvent that comprises 10-90% of the feed stream and using $AlCl_3$ as a catalyst with a small amount of water as a co-catalyst. The polymerization temperature is between 20° and 200° C. and conducted under sufficient pressure as to maintain a liquid phase reaction.

The polymerization product will typically contain between 100 and 1,000 ppm chlorine and will have a Gardner color number in the range of 6.0-10. The Gardner color number test used for the analysis was ASTM D-1544-68 except that the solution concentration was 40 weight percent and the solvent was Varsol ® or mixtures of Varsol ® with hydrocarbons of 10 or less carbons in number. The Gardner color number at 6.0 is a dark red. The processing catalyst of this invention can improve the Gardner color to 1-3 which is light in color to almost colorless resin. The process also improves the adhesive properties and ultraviolet stability of the final product.

Table I contains a summary of composition of the catalysts on a support. The support could be chosen from alumina, silica, silica-alumina or other catalyst support materials. In addition to the support, the catalyst is composed of metal oxides from three groups of (1) Group VIIIA of the Periodic Chart, (2) a group composed of tungsten or molybdenum oxide and, (3) a group composed of the basic promoter oxides including Groups IA, IIA of the Periodic Chart and the Lanthanides and Actinides of the Periodic Chart. The Periodic Chart of the Elements from *The Merck Index*, 10th ed., Merck & Co., Inc. (1983) is incorporated by reference in this specification.

TABLE I

| Catalyst Composition on Support | | | |
|---|---|---|---|
| | Range (wt % to Total wt.) | Preferred Range (wt % to Total wt.) | Preferred Element(s) |
| (1) Group VIIIA Metal Oxides | 1-12 | 3-6 | Ni, Co, or mixtures thereof |
| (2) Tungsten or Molybdenum Oxide | 3-35 | 15-25 W 8-12 Mo | — — |
| (3) Basic Promoter Oxide Groups IA, IIA, Lanthanides or Actinides | 0.25-10 | 1-3 | La, K |

The basic promoter is necessary for halogen resistance of the catalyst. The preferred basic promoters are lanthanum and potassium. The broad range includes Groups IA, IIA, Lanthanides or Actinides from the Periodic Chart of the Elements. Of the basic promoters, the catalyst can be made with lanthanum, potassium, magnesium, rubidium, cesium, neodymiun, zinc and calcium among others. Table I contains the broad range and preferred range of each of the components of the catalyst other than the support.

The preferred support is alumina in predominantly the gamma or eta form. The alumina support of this invention is predominantly, meaning at least 50%, in the gamma or eta form. The alumina for the support is further selected based on the size of the molecules of the feedstock. The larger the size of the molecules of the feedstock, the larger the pore size. In the case of processing petroleum resins, the preferred alumina support has less than 70% of pore volume in the 15-300 angstrom radius and at least 10% of the total pore volume between 10,000 and 75,000 angstroms.

The catalysts were prepared using an incipient wetness technique on preformed alumina extrudates. An aqueous metal salt solution is prepared from the components selected from Table I. The volume of the impregnation solution is adjusted to completely fill the pore volume of the alumina support. A single impregnation step was used to add the metal salts to the alumina support. After impregnation, the alumina support filled with the metal salt solution was dried at a 110° C. to constant weight (about 60 to 150 minutes). After drying, the sample was calcined at 350° C. for one hour.

The catalyst may be prepared by other known preparation techniques. Examples of other methods may include sequential addition of the metal salts or multiple impregnations. Drying and calcining between addition of metal salts could also be used.

The catalyst A (without the basic promoter), B and C shown in Table II were prepared using the single impregnation step with the metal salts of the respective oxides as follows: $Ni(NO_3)_2.6H_2O$; $(NH_4)_6H_2W_{12}O_{40}.4H_2O$; $La(NO_3)_3.6H_2O$, $KNO_3$.

TABLE II

| Chemical Analyses of Finished Catalysts Dried | | | |
|---|---|---|---|
| | A (without basic promoter) | B | C |
| NiO wt % | 5.0 | 6.0 | 6.0 |
| $WO_3$ wt % | 20.0 | 20.0 | 20.0 |
| $La_2O_3$ wt % | | 2.0 | |
| $KO_2$ wt % | | | 2.0 |
| $Al_2O_3$ wt % | 75.0 | 72.0 | 72.0 |

Table II contains examples B and C of catalyst representative of this improved process which are two of the many compositions that may be made and used in hydrotreating halogen containing feedstocks.

The catalysts of this invention are activated by a sulfiding agent in the presence of hydrogen. The sulphur compounds that can be used include $H_2S$, carbon disulfide, methyldisulfide, ethyldisulfide, propyldisulfide, isopropyldisulfide, butyldisulfide, tertiary butyldisulfide, thianaphthene, thiophene, secondary dibutyldisulfide, thiols, sulfur containing hydrocarbon oils and sulfides such as methylsulfide, ethylsulfide, propylsulfide, isopropylsulfide, butylsulfide, secondary dibutylsulfide, tertiary butylsulfide, dithiols and sulfur bearing gas oils. Any other organic sulphur source that can be converted to $H_2S$ over the catalyst in the presence of hydrogen can be used. The catalyst may also be activated by an organo sulfur process as described in U.S. Pat. No. 4,530,917 and other processes described therein and is incorporated by reference into this specification.

The feedstock for this hydrotreating process can be a halogen containing olefinic or saturated hydrocarbon mixture. The resins that can be used for feedstock are prepared by polymerizing a mixture of 4 to 6 carbon olefins and diolefins including cyclic olefins and mixtures of 8-9 carbon aromatics containing an olefinic function such as indene or styrene. The resins may also be made from either the 4-6 carbon materials or the 8-9 carbon materials alone. Polymerization of these olefin mixtures is conducted in a solvent that will comprise between 10-90% of the total feed stream using $AlCl_3$ as a catalyst and small amounts of water as a co-catalyst. The temperatures of polymerization are between 20° C. and 200° C. and conducted under sufficient pressure to maintain a liquid phase reaction. The olefinic or diolefinic feedstock for the resins could be polymerized by other catalysts such as $BF_3$. During the polymerization reaction, a portion of the halogen from the catalyst is incorporated into the resin. Halogen incorporated into the resin results in deactivation of typical hydrotreating catalyts. The feedstock can be mixed with a solvent prior to hydrotreating that will comprise between 10-90% of the total feed stream. If the feedstock contains a high amount of halogen, it may be necessary to dilute the feedstock so that the halogen content does not exceed 1% of the feedstock.

The hydrotreating process may be run under pressure of atmospheric to 4,000 psi of hydrogen with varying temperatures of 150° C. to 320° C. Depending on conditions and feedstock, the reaction is carried out in gas phase, liquid phase or mixed phase. These conditions are well known in the prior art.

Under commercial conditions, the processing temperature ranges are 150° C. to 320° C. with pressure ranges of 100 to 4,000 psi of hydrogen. The reactors for using the catalyst of this invention could be fixed, fluid or ebulating beds. The reactors could be isothermal, adiabatic, controlled non-adiabatic, non-isothermal condition by heat transfers since hydrogenation reactions are exothermic.

Catalysts A, B and C from Table II were prepared and run at atmospheric pressure. Catalyst A did not have the basic promoter component and typifies a hydrotreating catalyst. Catalysts B and C contain the basic promoter and were not deactivated by a halogen containing feedstock. Each catalyst A, B and C was activated with t-dibutyldisulfide (2.0 wt.% sulfur) in n-octane sulfiding solution. The liquid hourly space velocity (volume of liquid per volume of catalyst per hour) of the sulfiding solution was 1.6 and the gas/liquid ratio was 750 (volume H$_2$ at STP per volume of liquid). The activation procedure was carried out in four steps in isothermal mode. The catalyst temperature was raised from 25° C. to 220° C. at 1° C./minute and held at 220° C. for four hours; raised from 220° C. to 310° C. at 1° C./minute and held at 310° C. for one hour; and further raised from 310° C. to 320° C. at 1° C./minute and held at 320° C. for ten hours. The catalsyt was then cooled to 200° C. at 2° C./minute.

After activation, the catalyst was injected with n-decane. The feedstock was 1-octene 2% by weight in n-decane and 500 ppm by weight 1-chlorooctane in n-decane. The 1-chlorooctane was the chloride source. The liquid hourly space velocity was 1.6 and the gas to liquid ratio was 750. Catalysts B and C converted the octene to octane in the presence of clorooctane. The chlorine was eliminated. The catalyst A, a nickel tungsten catalyst without a basic promoter, dropped in efficiency shortly after adding the chlorine containing feedstock.

The following Table III is a comparison of catalysts A, B and C in the atmospheric pressure runs. The products of the feedstock 1-octene and 1-chlorooctane were measured by gas chromatography. The results for all three catalysts showed no chlorooctane in the product, and virtually all the feedstock was dehalogenated. However, the catalyst without the basic promoter, Catalyst A, showed a great decrease in hydrotreating capability. The percentage of hydrogenated product decreased rapidly after seven hours of exposure to the halogen containing feedstock.

The catalysts with the basic promoters lanthanum oxide and potassium oxide, catalysts B and C, respectively, continued to hydrogenate the feedstock for extended lengths of time prior to terminating the runs. It is expected that the catalyst will perform efficiently for longer periods of time.

TABLE III

Comparison of Catalyst Hydrotreating Ability at 180° C. 1 atm H$_2$

| Run Length t (hrs) | % Saturated Product[1] | % Unsaturated Product[2] |
|---|---|---|
| Catalyst A Without Basic Promoter - 532 ppm Cl ||| 
| 0.00 | 91.27 | 8.73 |
| 3.20 | 83.46 | 16.54 |
| 7.63 | 75.11 | 24.89 |
| 23.87 | 58.51 | 41.49 |
| 31.32 | 53.89 | 46.12 |
| 47.80 | 54.74 | 45.26 |
| 49.67 | 56.49 | 43.51 |
| Catalyst B Lanthanum Oxide Promoter - 510 ppm Cl |||
| 0.00 | 95.35 | 4.65 |
| 3.70 | 85.34 | 14.66 |
| 6.92 | 92.24 | 7.76 |
| 23.20 | 88.60 | 11.40 |
| 27.62 | 88.47 | 11.53 |
| 31.19 | 84.16 | 15.84 |
| 47.46 | 88.57 | 11.43 |
| 51.69 | 89.21 | 10.80 |
| 120.74 | 91.09 | 8.91 |
| 126.54 | 88.56 | 11.43 |
| 151.21 | 91.68 | 8.33 |
| Catalyst C Potassium Oxide Promoter - 504 ppm Cl |||
| 0.0 | 88.15 | 11.86 |
| 3.4 | 89.67 | 10.33 |
| 7.0 | 92.36 | 7.65 |
| 23.1 | 89.27 | 10.73 |
| 46.6 | 88.71 | 11.29 |
| 70.5 | 88.80 | 11.20 |
| 77.2 | 88.71 | 11.29 |
| 173.9 | 83.40 | 16.60 |
| 190.5 | 82.82 | 17.18 |
| 199.0 | 88.04 | 11.95 |
| 214.8 | 89.08 | 10.93 |
| 238.5 | 89.66 | 10.34 |
| 245.9 | 91.62 | 8.39 |

[1]Saturated product of primarily n-octane with minor amounts of branched octanes.
[2]Unsaturated product of primarily n-octene with minor amounts of branched octenes.

High pressure runs were conducted with catalysts A and B. The catalyst was washed with Varsol 1 (Registered Trademark), a paraffinic solvent containing 20 wt. % aromatics and boiling from 150° C. The catalyst was activated with the sulfiding agent dimethyldisulfide in Varsol 1 solution, VVH 0.5. Concentration of the sulfiding agent was 1.0 wt. % sulfur. The catalyst bed was raised to 240° C. and held at 240° C. for four hours. The reactor was further raised to 330° C. and the sulfiding agent concentration was raised from 1.0 wt. % to 2.0 wt. % sulfur. The sulfiding agent flow at 330° C. was maintained for 72 hours. The reactor was cooled to 200° C. with Varsol 1 at VVH 0.5 and flushed. The feedstock was a hydrocarbon resin prepared by aluminum chloride catalysis of a feed mixture of mainly 5 carbon olefins and diolefins and 8 and 9 carbon aromatics. This resin had a chlorine content of 150 ppm by weight (at 40 wt. % concentration in a raffinate solvent) and had an initial Gardner color number of 6.0. By NMR analysis, the resin contained 14.8% aromatics, 2.2% olefins, and 83.0% saturates. The feedstock was prepared in a 40 wt. % solution in Varsol 1. The hydrogenation was done under isothermal conditions at 200° C., VVH 1.0, and 3000 psi H$_2$.

Catalyst B is the chlorine resistant composition of this invention and exhibited chlorine tolerance as indicated by the improved Gardner color number of the resin. The initial feedstock was 6.0 and after running on catalyst B the product was Garnder color number 2-3. Catalyst A showed increased Gardner color number to 5 after 240 hours.

TABLE IV

Comparison of Catalyst Performance
Gardner Color Number
Initial Resin Feedstock Gardner Color 6.0

| Run Time (Hr.) | Gardner Color |
| --- | --- |
| Test of Catalyst A Without Basic Promoter 2900 psi, LHSV = 1.1, G/L = 460 | |
| 24 | 1.2 |
| 48 | 1.1 |
| 72 | 0.8 |
| 96 | 1.6 |
| 120 | 1.4 |
| 144 | 1.4 |
| 168 | 2.0 |
| 192 | 2.3 |
| 216 | 3.2 |
| 240 | 5.2 |
| 264 | 4.3 |
| 288 | 4.9 |
| Test of Catalyst B With Lanthanum Oxide Basic Promoter 2900 psi, LHSV = 1.0, G/L = 530 | |
| 24 | 2.4 |
| 48 | 2.4 |
| 72 | 2.4 |
| 96 | 2.8 |
| 120 | 3.0 |
| 144 | 2.8 |
| 168 | 2.5 |
| 192 | 2.3 |
| 216 | 2.0 |
| 240 | 2.1 |
| 264 | 2.3 |

The process and catalyst of this invention provide an extended life hydrotreating capability for halogen containing feedstocks. Saturated feedstocks are dehalogenated. The olefinic feedstocks are saturated as well as dehalogenated. The process and catalyst of this invention can be used to process a variety of feedstocks for extended periods of time without deactivation of the catalyst.

What is claimed is:

1. In a hydrotreating process for treating a halogen containing feedstock comprising at least one of the group consisting of olefins, diolefins and aromatics containing olefinic functions wherein the feedstock contains up to 1% by weight of a halogen, the improvement comprises using a sulfide activated catalyst comprising 1-12% by weight of oxides of Group VIII metal, 3-35% by weight tungsten oxide or molybdenum oxide and 1-10% by weight a basic promoter oxide selected from the group consisting of IA, IIA, Lanthanides and Actinides of the Periodic Chart on a support.

2. A hydrotreating process of claim 1 wherein the Group VIII metal oxide is selected from cobalt, nickel or mixtures thereof.

3. A hydrotreating process of claim 1 wherein the basic promoter oxide is selected from lanthanum and potassium.

4. A hydrotreating process of claim 1 wherein the support is alumina.

5. A hydrotreating process of claim 1 wherein the support is an alumina support in predominantly the gamma or eta form.

6. A hydrotreating process of claim 1 wherein said feedstock is run at a minimum temperature of 150° C.

7. A hydrotreating process of claim 1 including the step of dehalogenation of the feedstock.

8. A hydrotreating process of claim 1 comprising 1-3% by weight of said basic promoter oxide.

9. A hydrotreating process of claim 8 wherein the basic promoter oxide is selected from lanthanum and potassium.

10. A process for catalytic hydrogenation of claim 6 wherein said feedstock is run at about 175° to 300° C.

11. A process for catalytic hydrogenation of a halogen containing petroleum resin containing up to 1% by weight of a halogen comprising the steps of preparing a feedstock of the hydrocarbon resin in a solvent; further contacting the feedstock with a sulfide activated catalyst comprising 1-12% by weight of oxides selected from Group VIII metal, 3-35% by weight of an oxide selected from tungsten and molybdenum, and 1-10% by weight of a basic promoter oxide selected from the group consisting of IA, IIA, Lanthanides and Actinides said catalyst on a support.

12. A process for catalytic hydrogenation of claim 11 wherein the Group VIII metal oxide is selected from cobalt, nickel and mixtures thereof.

13. A process for catalytic hydrogenation of claim 11 wherein the basic promoter oxide is selected from lanthanum and potassium.

14. A process for hydrotreating of claim 11 wherein the petroleum resin is dissolved in 10% to 90% by weight of a solvent.

15. A process for hydrotreating of claim 11 wherein said support is alumina having less than 70% of pore volume in the 15-300 angstrom radius and at least 10% of the total pore volume between 10,000 and 75,000 angstroms.

16. A process for catalytic hydrogenation of claim 8 wherein said support is alumina predominantly in the gamma or eta form.

17. A process for catalytic hydrogenation of a halogen containing resin of claim 11 comprising 1-3% by weight of said basic promoter oxide.

18. A process for catalytic hydrogenation of a halogen containing resin of claim 17 wherein the basic promoter oxide is selected from lanthanum and potassium.

* * * * *